United States Patent [19]

Block

[11] 4,255,268

[45] Mar. 10, 1981

[54] DRILLING MUD VISCOSIFIER

[75] Inventor: Jacob Block, Rockville, Md.

[73] Assignee: W. R. Grace & Co., New York, N.Y.

[21] Appl. No.: 924,658

[22] Filed: Jul. 14, 1978

[51] Int. Cl.³ .............................................. C09K 7/04
[52] U.S. Cl. .............................. 252/8.5 B; 252/8.5 A
[58] Field of Search ............. 252/8.5 A, 8.5 B, 8.5 R, 252/317

[56] References Cited

U.S. PATENT DOCUMENTS

| | | | |
|---|---|---|---|
| 1,935,178 | 11/1933 | Connolly | 252/317 X |
| 2,085,129 | 6/1937 | Stoewener | 252/317 |
| 3,852,201 | 12/1974 | Jackson | 252/8.5 |
| 3,878,110 | 4/1975 | Miller et al. | 252/8.5 |
| 3,988,246 | 10/1976 | Hartfiel | 252/8.5 |

*Primary Examiner*—Herbert B. Guynn
*Attorney, Agent, or Firm*—Howard J. Troffkin

[57] ABSTRACT

A water-based, clay-free drilling fluid for use in drilling bore holes into subterranean formations having an aqueous mixture therein comprising water and a ferric hydroxide compound. The aqueous phase of the drilling fluid has the ferric hydroxide agent therein in an amount sufficient to impart non-Newtonian, pseudoplastic properties to the fluid at a pH of at least about 8. The present invention further relates to an improved process of drilling bore holes into subterranean formations using the subject drilling fluid.

14 Claims, 1 Drawing Figure

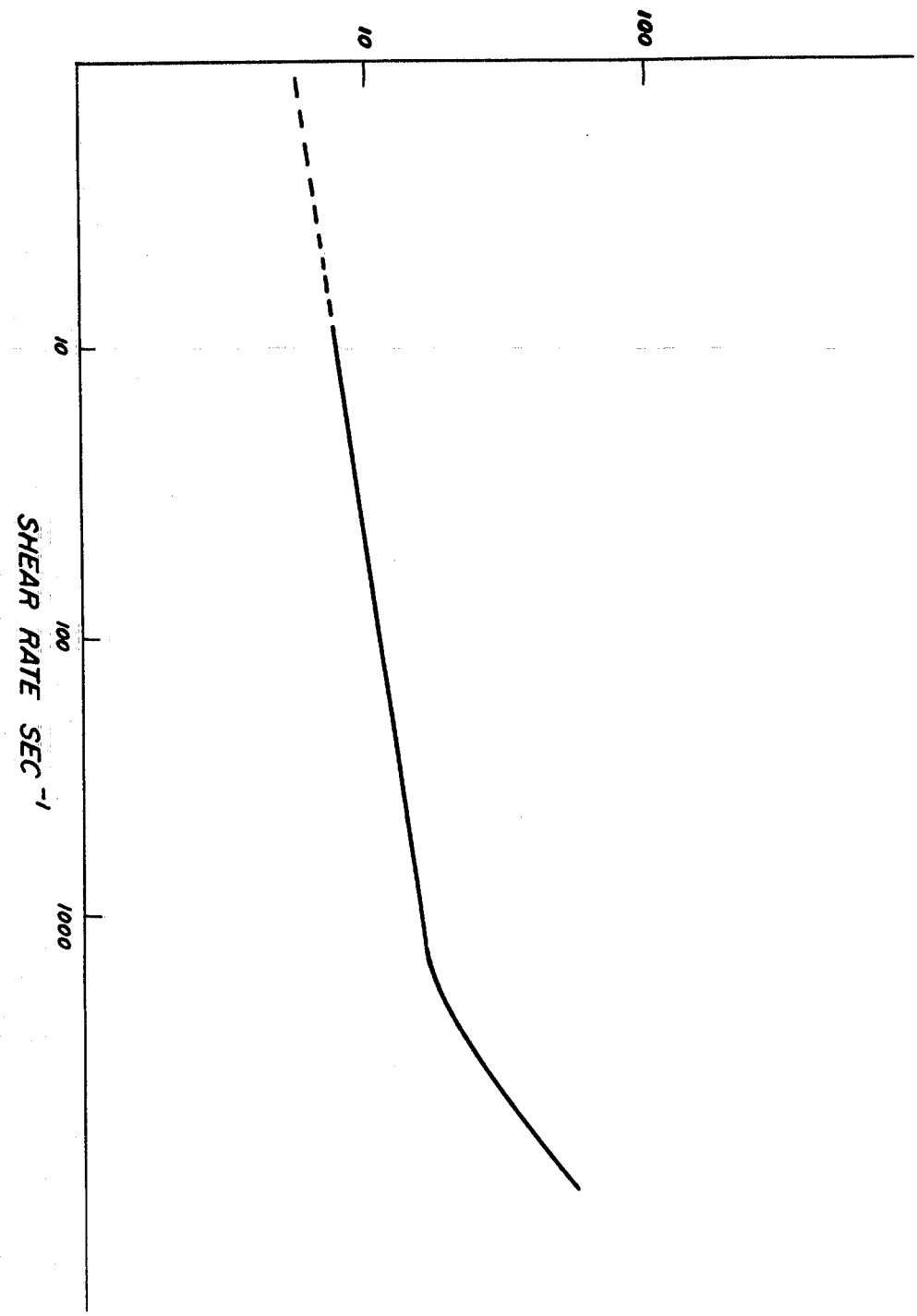

DRILLING MUD VISCOSIFIER

BACKGROUND OF THE INVENTION

The present invention relates to the formation of water-based, clay-free drilling fluids containing an effective amount of ferric hydroxide agent as the agent to impart viscosity and pseudoplastic properties to the fluid and to methods of using such fluids in the drilling of subterranean soil.

In normal well drilling operations in which a bore hole is drilled by a rotary method, the bore hole is generally filled with a drilling fluid or mud which is circulated therein. Drilling fluids are usually pumped down through the drill stem of the rotary rig, circulated around the drill bit and returned to the surface through the annular passage between the drill stem and well casing. These drilling fluids perform a number of functions including lubricating the drill stem and bit, cooling the bit, carrying the cuttings from the bit up the bore hold to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high sheer conditions which are present in the environs of the drill bit while, at the same time, also being capable of exhibiting comparatively high viscosities and carrying power under varying low shear conditions which are exerted in the annular passage between the drill stem and the well casing during the fluid's upward flow movement. In generic terms, the drilling fluid must exhibit non-Newtonian properties as a pseudoplastic fluid, especially under varying low shear rates such as are encountered in the annular passage.

The drilling fluid should also be capable of exhibiting the above described pseudoplastic properties under changing conditions encountered during the drilling operation due to the fact that the bore hole traverses various strata such as shales, clay, etc., and the cuttings of these materials become dispersed in the fluid medium. The drilling fluid components should, therefore, be substantially stable to the presence of various calcium compounds and to sodium chloride which may be present in the fluid from the soil strata with which it is in contact and/or due to the use of salt water used to form the drilling fluid.

It is also well known that as the bore hole increases in depth the temperatures encountered substantially increase above that found at the earth's surface. This is especially a problem found in drilling to depths greater than about 9,000 feet as is presently becoming a more common practice. In addition, heat is generated by frictional forces on the drill bit. It is, therefore, not uncommon for the drilling fluids to encounter temperatures of 200° F. or greater. Components used in the forming drilling fluids should be stable with respect to elevated temperature conditions.

A wide variety of drilling fluids have been used, including aqueous based liquids, hydrocarbon based liquids, air and other gases, mist, foams and the like. Since great volumes of drilling fluids are required for the purposes of providing a cooling medium for the rotary bit and a means of carrying off the drilled particles, most of the conventional fluids used have been based on water. Water, being a Newtonian fluid, does not have the needed capability to efficiently carry the drilled particles from the bore hole to the surface. This becomes increasingly apparent as the bore hole increases in depth.

It is a widely held and accepted theory that the viscosities suitable for creating a particle carrying capacity in the fluid can be achieved with a drilling fluid having pseudoplastic properties, that is, that the viscosity must be sufficient to prevent the drilled particles from separating from the drilling fluid when the fluid is under the influence of low shear forces such as encountered in the annular passage. In order to obtain the requisite pseudoplastic properties, it has been thought desirable to use certain clay or colloidal clay bodies such as bentonite or attapulgite clays. As a result, the drilling fluids have been usually referred to as "muds." The use of clay-based drilling fluids has provided the means of initially meeting the two basic requirements of drilling fluids, i.e., cooling and particle removal. However, these clay-based drilling fluids are highly unstable when they come in contact with various salts commonly found in drilled earth formations.

Materials which have come into expanding use as the viscosifying agent of drilling compositions are Xanthan gums such as are described in U.S. Pats. Nos. 3,198,268; 3,208,526; 3,251,147; 3,243,000; 3,307,016 and 3,319,715.

These materials have been found to cause acqueous drilling fluids to exhibit pseudoplastic properties under varying low shear forces. These materials, however, whether used alone or in combination with other additives, are irreversibly degraded by the elevated temperatures often encountered during conventional drilling operations. The high cost of the Xanthan gums and the high rate of degradation limit their usefulness to specialized operations.

Iron compounds have previously been used in drilling fluids as additives to enhance certain specific property of the fluid. For example, iron oxides of magnetite and hematite have been added to drilling fluids to increase the overall density of the fluid. U.S. Pat. No. 2,868,726 to Bruker et al. discloses that a water soluble iron-containing compound may be added to lime muds to increase their high temperature gelation properties. U.S. Pat. No. 2,393,166 to Hoeppel discloses the use of water soluble salts of iron as an agent capable of inhibiting the hydroxyl ion concentration in the drilling fluid. These water-soluble products are not capable of imparting the highly desired pseudoplastic properties.

There is a general need for a drilling fluid viscosifier which is capable of being produced at low cost, which renders an aqueous drilling fluid pseudoplastic so as to exhibit ease of fluidity under high shear condtions such as found at the drill bit site while exhibiting an increased, substantially stable viscosity under low shear conditions and which is substantially stable under conditions normally encountered in drilling a bore hole.

SUMMARY OF THE INVENTION

It is an object of the present invention to form water-based, clay-free fluids which exhibit non-Newtonian, pseudoplastic properties so as to be capable of drilling bore holes and the like in an efficient manner. Further, it is the object of the present invention to form a drilling fluid which is substantially stable to varying environmental conditions of temperature and salt content normally encountered in bore hole drilling.

The present invention is directed to clay-free drilling fluids useful in effectively aiding the drilling of bore holes and the like in subterranean strata wherein the fluid is water-based fluid having an effective amount of a ferric hydroxide agent therein to impart viscosity and pseudoplasticity to the fluid and wherein the aqueous fluid has a pH of at least about 8. It has been unexpectedly found that drilling fluids described herein exhibit non-Newtonian, pseudoplastic properties under varying low shear forces and are substantially stable under varying temperature and salt conditions as are commonly encountered in the drilling of bore holes and the like.

BRIEF DESCRIPTION OF DRAWING

FIG. 1 represents a typical curve of shear stress vs. shear rate for fluids formed in accordance with the present invention.

DETAILED DESCRIPTION OF THE INVENTION

The present invention is directed to a viscosifier for water-based, clay-free drilling fluid compositions which causes the composition to exhibit pseudoplastic properties, and to methods of drilling bore holes into the earth by utilizing the subject drilling fluid composition. Specifically, the subject invention is directed to drilling fluid compositions comprising water and a ferric hydroxide agent as the viscosifying and pseudoplasticizing agent.

The ferric hydroxide agent of the subject invention is the reaction product formed by contacting in an aqueous system a water-soluble ferric salt with a water-soluble base under a high degree of agitation. The ferric salt can be a ferric halide, as for example ferric chloride, or it can be ferric sulfate, ferric nitrate and the like, with ferric chloride or sulfate salts being preferred. The base can be any inorganic base which contains or produces hydroxide groups when in contact with water, as for example an alkali metal hydroxide, such as sodium hydroxide and the like, as well as ammonium hydroxide or a salt of a weak acid and a strong base.

The ferric hydroxide agent of the subject invention should be formed by mixing the above reagents under high speed mixing conditions as can be encountered with conventional high speed mixers as emulsifiers, dispersers or high speed positive shear mixers and the like for a period of time to insure substantially complete mixing of the reactants. Mixing times of from about 1 to 15 minutes normally would be sufficient. The amount of base should be at least about three moles of hydroxyl per ferric atom and should be sufficient to cause the pH of the resultant aqueous system to be at least about 8, preferably between about 8 and 12, and most preferably between about 8 and 10.

It has been unexpectedly found that water-based, clay-free drilling fluids which contain the above described aqueous systems and having the subject ferric hydroxide agent therein exhibit the desired properties of viscosity and non-Newtonian pseudoplasticity. It has also been unexpectedly found that the preferred combination of viscosity and pseudoplastic properties are imparted to the water-based drilling fluid composition when the aqueous system has a pH within the range of from about 8 to 12.

The subject ferric hydroxide agent can be formed in an aqueous system in concentrations of from about 5 to 50 percent by weight based on the water present. The concentration can vary outside of this range, but should not be such as to inhibit the thorough mixing under high speed agitation of the reactants during the formation of the subject ferric hydroxide viscosifying agent. Further, it has been found that the rheological properties of the resultant water-based drilling fluid are enhanced by subjecting the aqueous system containing the ferric hydroxide agent to mixing at high shear rates of about 20,000 sec$^{-1}$ or greater, for short periods of time as from about 5 to 60 minutes, such as by circulating the aqueous system through a small orifice I.D. tube at a high rate prior to utilization as a drilling fluid.

The aqueous system in which the subject ferric hydroxide agent is formed can be directly used to form the water-based drilling fluid of the subject invention by diluting the aqueous system with a sufficient amount of water to form a system having an effective amount of the subject ferric hydroxide agent therein to impart the desired rheological properties. Normally, concentrations of from 0.5 to 10 percent and preferably from 2 to 6 percent by weight based on the weight of the water have been found to impart the desired properties. The concentration most suitable can be readily determined in conventional manners by the mud engineer taking into consideration any other materials which may be contained in the drilling fluid. The pH of the water-based drilling fluid should be maintained within the range described above.

The above described ferric hydroxide agents are capable of causing a clay-free, (the term "clay-free" when used herein refers to the absence of drilling fluid viscosifying clays as an essential agent of the fluid and not to other materials entrained therein) water-based drilling fluid (the term "fluid" or "system" when used herein refers to water containing the ferric hydroxide agent of the subject invention in suspension or dispersion) to have suitable rheological properties of viscosity and non-Newtonian, pseudoplasticity; that is to say that the viscosity of the resultant water-based drilling fluid varies inversely with respect to the shear rate exerted on the fluid. The relationship of the shear stress with respect to shear rate can be defined by the rheological power law model relationship of $$\lambda = K(\dot{\gamma})^n$$

in which $\lambda$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$, K is a constant having the value of the shear stress of the particular system at a shear rate of 1 sec$^{-1}$ and n is a numerical value of from 0 to 1. It has been unexpectedly found that water-based drilling fluids containing the presently described ferric hydroxide viscosifying agent exhibit shear stress ($\tau$) properties at varying shear rates ($\dot{\gamma}$) in the range of from about 10 to at least about 400 sec$^{-1}$, that is, in the range normally encountered in the annular region of the bore hole, such that n of the power law relationship has a value of up to about 0.4. Such systems, therefore, exhibit non-Newtonian, pseudoplastic properties to an exceptionally high and desirable degree.

FIG. 1 is a typical graphic presentation of the shear stress at varying shear rates which are obtained from aqueous solutions containing the presently disclosed product. When plotting log shear stress vs. log shear rate, with log shear stress being plotted on the abscissa and log shear rate on ordinate of the graph, the desired properties are readily apparent. At low shear rates, such as from about 10 to at least about 400 sec$^{-1}$, as are encountered in the annular region of the bore hole, the shear stress should increase at a low rate with respect to the shear rate exerted on the material which is observed as a low slope (or n value according to the power law relationship) of the curve in this region. The lower the slope of n value within this region the more desirable the fluid. In certain instances the slope may continuously or segmentally change but should retain a value for n of about 0.4 or less. At high shear rates, such as are found in the region of a drill bit in a drilling operation, the fluid should have a low viscosity, that is, approach the viscosity of water. At such viscosities the fluid approaches a Newtonian liquid as can be seen by an increased slope of the curve (n having a value approaching or equal to unity). The value for K in the power law model relationship is the shear stress value determined or extrapolated for a shear rate of 1 sec$^{-1}$ and is directly proportional to the viscosity of the aqueous system.

In addition to presently finding that the subject ferric hydroxide agent imparts desired viscosity and pseudoplasticity to water-based drilling fluids, it has been further unexpectedly found that the subject agents have excellent stability to temperature, calcium and sodium salts and various other conditions desired of a fluid used in the rotary drilling of bore holes and the like. The drilling fluids containing the subject ferric hydroxide agents have unexpectedly been found to have high degrees of stability with respect to their rheological properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The high degree and breadth of stability of the presently achieved drilling fluid, when combined with its ability to exhibit non-Newtonian pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole. Drilling fluids having concentrations of from about 0.5 l to about 10 percent and preferably 2 to 6 percent active solids (as ferric hydroxide) yield fluid systems which unexpectedly have the desired properties.

The drilling fluid composition of the subject invention can contain other conventional drilling fluid additives such as water-loss inhibitors as, for example, polyanionic cellulose and the like; and weighting agents as, for example, crushed oyster shells, barite, and the like.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

This material can be used with conventional bore hole drilling equipment in manners known to those skilled in the art to efficiently and effectively drill bore holes into subterranean formations. The pseudoplastic properties of the present drilling fluid permits effective removal of the cuttings from the area at and around the drill bit to permit more efficient drilling of the formation.

The following examples are given for illustrative purposes only and are not meant to be a limitation on the subject invention except as indicated by the appended claims. All parts and percentages are by weight unless otherwise indicated. The units of K of the power law model relationship are lb-sec/100 ft$^2$.

EXAMPLE 1

To 235 parts of 14 percent FeCl$_3$.6 H$_2$solution formed with deionized water and commercially available ferric chloride was added 106.5 parts of 30.5 percent NaOH solution under high speed mixing. The resultant aqueous system was allowed to digest for about 24 hours after which the measured pH was 12.5. The aqueous system containing the formed ferric hydroxide agent was diluted with deionized water to form a fluid having the agent in 6.3 percent concentration. This material was tested for rheological properties at varying shear rates ranging from 10 sec$^{-1}$ to 1370 sec$^{-1}$ at a temperature of 25° C. using standard procedures with a Haake Rotovisco RV-I viscometer. The values of n and K (lb-sec/100ft$^2$) according to the power law model relationship were determined to be 0.18 and 6.2 respectively for shear rates up to about 400 sec$^{-1}$.

The sample was placed in a stainless steel pressure vessel, sealed and presurized with N$_2$ gas to 50 psig. The sample was subjected to 250° F. for 16 hours while under continuous agitation. The sample was allowed to cool to ambient temperature and the rheology was again determined in the same manner as described above. The values of n and K were determined to be 0.32 and 8.4 respectively for shear rates up to 700 sec$^{-1}$.

EXAMPLE 2

An aqueous system containing a ferric hydroxide viscosifying agent was formed in the manner described in Example 1 above except that the pH of the system was adjusted to 8.6. The aqueous system was diluted with water to have a concentration of ferric hydroxide of 6.3 percent. Rheological properties were determined using the Haake Rotovisco RV-I rotating viscometer at 25° C. the shear rate ranging from 10 to 1370 sec$^{-1}$. The results, when incorporated into the power law model relationship, give a value for K of 4.2 and for n of 0.33 for shear rates up to about 1370 sec$^{-1}$.

EXAMPLE 3

The aqueous system of Example 2 above was loaded with sodium chloride salts as well as with barite, a commercially available weighting agent used in drilling fluids. The materials were tested for their rheological properties at 25° C. and after thermal treatment at 250° F. for 16 hours as described in Example 1 above. The results are indicated in Table 1 hereinbelow.

TABLE I

| Sample | % Barite | % NaCl | Initial | | | After 250° F. for 16 hours | |
|---|---|---|---|---|---|---|---|
| | | | n | K | pH | n | K |
| 1 | 31* | 0 | 0.4 | 2.0 | 8.8 | 0.4 | 0.90 |
| 2 | 58** | 0 | 0.3 | 6.6 | 8.3 | 0.4 | 1.75 |
| 3 | 31* | 10 | 0.3 | 2.7 | 8.8 | 0.3 | 2.00 |

TABLE I-continued

| Sample | % Barite | % NaCl | Initial n | K | pH | After 250° F. for 16 hours n | K |
|---|---|---|---|---|---|---|---|
| 4 | 58** | 10 | 0.3 | 8.3 | 8.1 | 0.4 | 1.68 |

*Density of Resultant Fluid = 11 lbs/gal.
**Density of Resultant Fluid = 15 lbs/gal.

Each of the samples exhibited good viscosity and pseudoplasticity to form a desirable drilling fluid having high drilling efficiency, everything else being held constant. Further, the above results indicate the stability of the subject viscosifying agent in the presence of commonly encountered components of drilling fluids.

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. In a water-based, clay-free drilling fluid for use in drilling bore holes into subterranean formations wherein the fluid includes water, a water-loss inhibitor, a weighting agent and a viscosifying agent, the improvement which comprises that said viscosifying agent is a ferric hydroxide reaction product formed in an aqueous media by contacting under a high degree of agitation a water soluble ferric salt with a water soluble base which contains or produces hydroxide groups in water in amounts to cause the hydroxy to ferric ratio to be at least about 3:1, and to cause the resultant fluid to have a pH of at least about 8; said viscosifying agent being present in an amount of from about 0.5 to 10 weight percent based on the weight of the water present to impart pseudoplasticity to the resultant drilling fluid.

2. The water-based, clay-free drilling fluid of claim 1 wherein the pseudoplastic property of said fluid is defined by the formula $$\lambda = K(\dot{\gamma})^n$$

in which $\lambda$ represents the shear stress of the aqueous phase; $\dot{\gamma}$ represents the shear rate within the range of from about 10 to 400 sec$^{-1}$; K is a constant having the value of shear stress at the shear rate of 1 sec$^{-1}$ and n has a value of up to about 0.4.

3. The water-based, clay-free drilling fluid of claim 2 wherein the fluid has a pH of from 8 to 10.

4. The water-based, clay-free drilling fluid of claim 3 wherein the ferric hydroxide agent is present in from about 2 to 6 percent by weight based on the weight of water present.

5. The water-based, clay-free drilling fluid of claim 2 wherein the water-soluble ferric salt is selected from the group consisting of a ferric halide, ferric sulfate, ferric nitrate and the water-soluble base is selected from the group consisting of an alkali metal hydroxide, ammonium hydroxide and a salt of a week acid and a strong base.

6. The water-based, clay-free drilling fluid of claim 5 wherein the water-soluble ferric salt is ferric chloride and the water-soluble base is an alkali metal hydroxide.

7. The water-based, clay-free drilling fluid of claim 2 wherein the aqueous system containing the ferric hydroxide agent is subjected to high shear mixing for a period of from about 5 to 60 minutes.

8. In the process of drilling of a bore hole into a subterranean formation using conventional bore hole drilling equipment and water based, clay-free drilling fluid comprising circulating a drilling fluid in the bore hole while drilling; the improvement which comprises employing as said drilling fluid a water-based, clay-free drilling fluid including water and a viscosifying agent wherein said viscosifying agent is a ferric hydroxide reaction product formed in an aqueous media by a contacting under a high degree of agitation a water soluble ferric salt with a water soluble base which contains or produces hydroxide groups in water in amounts to cause the hydroxy to ferric ratio to be at least about 3:1, and to cause the resultant fluid to have a pH of at least about 8; said viscosifying agent being present in an amount of from about 0.5 to 10 weight percent based on the weight of the water present to impart pseudoplasticity to the resultant drilling fluid.

9. In the process of claim 8 wherein the pseudoplastic property of said fluid is defined by the formula $$\lambda = K(\dot{\gamma})^n$$

in which $\lambda$ represents the shear stress of the aqueous phase; $\dot{\gamma}$ represents the shear rate within the range of from about 10 to 400 sec$^{-1}$; K is a constant having the value of shear stress at the shear rate of 1 sec$^{-1}$ and n has a value of up to about 0.4.

10. In the process of claim 9 wherein the fluid has a pH of from 8 to 10.

11. In the process of claim 9 wherein the water soluble ferric salt is selected from the group consisting essentially of a ferric halide, ferric sulfate and ferric nitrate and the water-soluble base is selected from the group consisting of an alkali metal hydroxide, ammonium hydroxide and salts of a week acid and a strong base.

12. In the process of claim 9 wherein the aqueous system containing the ferric hydroxide agent is subjected to high shear mixing for a period of from about 5 to 60 minutes.

13. In the process of claim 10 wherein the ferric hydroxide is present in from about 2 to 6 percent by weight based on the weight of water present.

14. In the process of claim 12 wherein the water-soluble ferric salt is ferric chloride and the water-soluble base is an alkali metal hydroxide.

* * * * *